United States Patent
Shieh et al.

(10) Patent No.: US 11,649,168 B2
(45) Date of Patent: May 16, 2023

(54) PURIFICATION METHOD OF HIGH-PURITY N-TETRASILANE

(71) Applicant: Taiwan Speciality Chemicals Corporation, Xianxi Township, Changhua County (TW)

(72) Inventors: Sung-Yueh Shieh, Xianxi Township, Changhua County (TW); Teng-Chih Lee, Xianxi Township, Changhua County (TW)

(73) Assignee: Taiwan Speciality Chemicals Corporation, Changhua County (TW)

( * ) Notice: Subject to any disclaimer, the term of this patent is extended or adjusted under 35 U.S.C. 154(b) by 411 days.

(21) Appl. No.: 16/870,539

(22) Filed: May 8, 2020

(65) Prior Publication Data

US 2021/0347644 A1    Nov. 11, 2021

(51) Int. Cl.
*C01B 33/04*    (2006.01)

(52) U.S. Cl.
CPC .................................. *C01B 33/046* (2013.01)

(58) Field of Classification Search
CPC ...... C01B 33/046; C01B 19/002; C01B 33/02
See application file for complete search history.

(56) References Cited

U.S. PATENT DOCUMENTS

2020/0115242 A1*  4/2020  Itov ........................ B01D 3/009

* cited by examiner

*Primary Examiner* — Pancham Bakshi

(57) ABSTRACT

A high-purity n-tetrasilane purification method includes: introducing a tetrasilane ($Si_4H_{10}$) isomeric mixture into a solidifying purification tank, cooling the tetrasilane ($Si_4H_{10}$) to a predetermined temperature with refrigerant in the solidifying purification tank, maintaining the predetermined temperature between the freezing temperature of the n-tetrasilane (n-$Si_4H_{10}$) and of the i-tetrasilane (i-$Si_4H_{10}$), solidifying the n-tetrasilane (n-$Si_4H_{10}$) in the tetrasilane ($Si_4H_{10}$) isomeric mixture into solid state, and vacuuming the i-tetrasilane (i-$Si_4H_{10}$) from the mixture for separation.

8 Claims, 1 Drawing Sheet

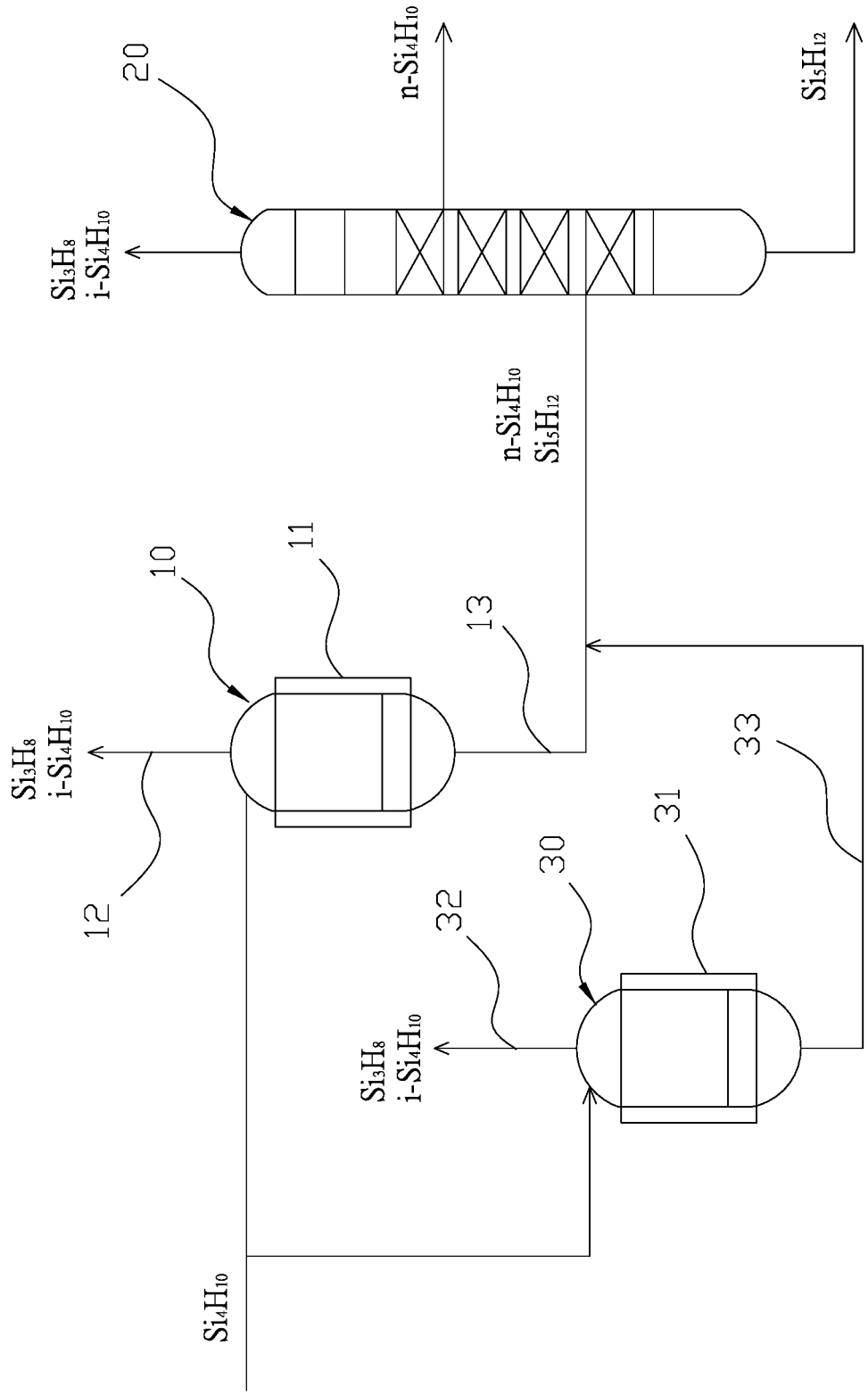

PURIFICATION METHOD OF HIGH-PURITY N-TETRASILANE

BACKGROUND OF INVENTION

Field of Invention

The present invention is related to a purification method of high-purity n-tetrasilane, and more particularly to a purification method of high-purity n-tetrasilane by utilizing its freezing point property to separate it from i-tetrasilane.

Description of the Related Art

The temperature requirement of the epitaxial film growth with silanes-employed processes is similar to the ones of germanes. Correspondingly, the application with silane/disilane is like the one of germane, the one of trisilane is similar to the one of digermane, and the employment of tetrasilane is resembled to the one of digermane or trigermane. The temperature requirement of the epitaxial film formation with tetrasilane can be as low as around 350° C., which is significantly lower than the formation temperature of applications with silane, disilane, and trisilane. Therefore, the application with tetrasilane holds an absolute advantage for the semiconductor epitaxial film growth process in the future.

At present, for higher silanes production with the silicon-magnesium alloy method, magnesium silicide is employed to react with ammonium chloride in an acidic solution. In such application, monosilane, however, is the primary product, whereas higher silanes, as desired products, are very rare. Yet, the cost of wastewater treatment post to the application is high, and the process equipment are all required to be strong-acid corrosion resistanted, which are all not economically cost-effective. The glow discharge method is the second way for higher silanes generation. Though the method is excellent in its reaction rate for the yield of higher silanes, due to the complexity of the systematic technologies it cannot be commercialized, and the application can only be limited to the laboratory-scale. Besides, in the silane pyrolysis method, which is the most practical approach, thermal energy is applied to silane or disilane to synthesize higher silanes, and the higher silanes obtained by such method contains not only tetrasilane isomers, namely n-tetrasilane and i-tetrasilane, but also heavier silanes, such as pentasilanes, hexasilane, etc.

In the semiconductor CVD process, it is extremely important to use silane-based precursors to control the film formation quality and yield rate. The energy data of cracking the epitaxial silanes obtained from the CVD process reveals that the energy required for cracking Si—Si bonds is 310 kJ/mole, and for Si—H bonds is 380 kJ/mole. For i-tetrasilane, it requires additional energy to crack an additional Si—H bond which leads to higher energy requirement for the epitaxial process compared to the application with n-tetrasilane. Also, the additional energy provided to the process increases the instability of the epitaxial film and causes the yield rate to reduce. The boiling points of the n-tetrasilane (108.1° C.) and the i-tetrasilane (101.7° C.) are too close, which is only 6.4° C. in difference; therefore, it is very difficult to separate the i-tetrasilane from the n-tetrasilane in the tetrasilane isomeric mixture, especially with about 25% to 30% of the i-tetrasilane is contained, with a typical distillation column. As well, it is not easy to efficiently purify the n-tetrasilane with a general distillation column. Moreover, it may require more than four distillation columns to effectively achieve the purification and separation. In other words, this purification method would demand higher equipment capital, operational cost, and energy consumption.

Therefore, it is desirable to provide a high-purity n-tetrasilane purification method to mitigate and/or obviate the aforementioned problems.

SUMMARY OF THE INVENTION

An objective of present invention is to provide a purification method for high-purity n-tetrasilane collection, which is capable of improving the above-mention problems.

In order to achieve the above-mentioned objective, a high-purity n-tetrasilane purification method includes: introducing a tetrasilane ($Si_4H_{10}$) isomeric mixture into a solidifying purification tank, cooling the tetrasilane ($Si_4H_{10}$) to a predetermined temperature with a refrigerant at the solidifying purification tank, maintaining the predetermined temperature between the freezing temperature of the i-tetrasilane (i-$Si_4H_{10}$) and the n-tetrasilane (n-$Si_4H_{10}$) to condense the n-tetrasilane (n-$Si_4H_{10}$) into its solid form, and vacuuming the liquid i-tetrasilane (i-$Si_4H_{10}$) in the tetrasilanes isomeric mixture for separation.

Other objects, advantages, and novel features of this invention will become more apparent from the details of following description when the accompanying drawings are taken in conjunction with.

BRIEF DESCRIPTION OF DRAWINGS

FIG. 1 is a process flow chart of the purification method of high-purity n-tetrasilane according to the preferred embodiment of the present invention.

DETAILED DESCRIPTION OF THE PREFERRED EMBODIMENT

Please refer to FIG. 1 for the purification method of high-purity n-tetrasilane, a tetrasilane ($Si_4H_{10}$) isomeric mixture is introduced into a solidifying purification tank 10 and cooled to a predetermined temperature with a refrigerant, and a jacket 11 is flowed with the refrigerant on the solidifying purification tank 10 but not directly added to the solidifying purification tank 10. The predetermined temperature needs to be lower than the freezing temperature of n-tetrasilane (n-$Si_4H_{10}$), which is −89.9° C., and higher than the freezing temperature of i-tetrasilane (i-$Si_4H_{10}$), which is −99.4° C. In other words, the solidifying purification tank 10 needs to be cooled down to a predetermined temperature range from −90° C. to −99° C. with the refrigerant, and −95° C. is the best predetermined set temperature. With the proceeding, the n-tetrasilane (n-$Si_4H_{10}$) in the tetrasilane ($Si_4H_{10}$) isomeric mixture is frozen into its solid form. Furthermore, the solidifying purification tank 10 is connected with an extraction tube 12 for vacuuming to extract the liquid i-tetrasilane (i-$Si_4H_{10}$) and trace amount of trisilane ($Si_3H_8$) in the tetrasilane ($Si_4H_{10}$) mixture for separation and purification.

The solidifying purification tank 10 is evacuated until the pressure in the tank reaches −1.0 kg/cm²G, and with the degree of vacuum pressure, it indicates that the liquid and vapor substances are all removed from the mixture. The solidifying purification tank 10 is then warmed up to the ambient state to convert the remaining solid n-tetrasilane (n-$Si_4H_{10}$) to its liquid state. Furthermore, the solidifying purification tank 10 is connected with an output tube 13 to a distillation tower 20. The output tube 13 is used to discharge the liquid n-tetrasilane (n-Si$_4$H$_{10}$) to the distillation tower 20 by filling the pressurized helium to shove all of the n-tetrasilane (n-Si$_4$H$_{10}$) to the distillation tower 20 without consuming any energy. At the distillation tower 20, the pentasilanes (Si$_5$H$_{12}$) and heavier silanes, with boiling point higher than 130~153° C., contained in the tetrasilane mixture are further separated from the n-tetrasilane (n-Si$_4$H$_{10}$) through the bottom of the distillation tower 20, and the remaining PPM-graded of silanes, trisilane (Si$_3$H$_8$) and i-tetrasilane (i-Si$_4$H$_{10}$), with boiling temperatures lower than 101.7° C., are removed through the top of the distillation tower 20 by differences in their boiling temperatures. Since most of i-tetrasilane (i-Si$_4$H$_{10}$) and lower silanes are removed in the earlier process at the solidifying purification tank 10, the residual i-tetrasilane (i-Si$_4$H$_{10}$) in the distillation tower 20 is rare, and it does not affect the boiling temperature (108.1° C.) of the n-tetrasilane (n-Si$_4$H$_{10}$) for the fractional distillation purification. With the above proposed purification method, the n-tetrasilane (n-Si$_4$H$_{10}$) with a purity of 99.99% is then carried out by the final distillation purification at low cost in combined with simple equipment and low energy-consuming process.

Please refer to FIG. 1 again. A solidifying tank 30 is connected to the solidifying purification tank 10. The solidifying tank 30 is comprised of a refrigerant jacket 31, an extracting channel 32, and a discharge pipe 33. The configuration of the solidifying tank 30 is resembled to the solidifying purification tank 10, and it can be implemented for purifying the n-tetrasilanes (n-Si$_4$H$_{10}$) alternatively. When the solidifying purification tank 10 is in the process of warming up to liquefy the n-tetrasilane (n-Si$_4$H$_{10}$), the refrigerant jacket 31 of the solidifying tank 30 is flowed with the refrigerant for cooling the introduced tetrasilanes (Si$_4$H$_{10}$) within. Then, the unsolidified tetrasilane (i-Si$_4$H$_{10}$) and trace trisilane (Si$_3$H$_8$) are separated and extracted out through the extracting channel 32 to only retain the solidified n-tetrasilane (n-Si$_4$H$_{10}$) in the solidify tank 30. Afterward, the n-tetrasilane (n-Si$_4$H$_{10}$) in the solidifying tank 30 is warmed up to the ambient temperature while the liquid n-tetrasilane (n-Si$_4$H$_{10}$) in the solidifying purification tank 10 is shoved into the distillation tower 20 for final purification. Rotationally, the tetrasilanes (Si$_4$H$_{10}$) (raw material) is again brought into the empty solidifying purification tank 10 for cooling, while the n-tetrasilane (n-Si$_4$H$_{10}$) in the solidifying tank 30 is warming up and discharging to the distillation tower 20 through the discharge pipe 33. With the two resembling settings in the purification system for alternative and/or rotational practices, the n-tetrasilane (n-Si$_4$H$_{10}$) is efficiently separated and obtained from the tetrasilane (Si$_4$H$_{10}$) isomeric mixture.

Although the present invention has been explained in relation to its preferred embodiment, it is to be understood that many other possible modifications and variations can be made without departing from the spirit and scope of invention as hereinafter claimed.

What is claimed is:
1. A purification method for high-purity n-tetrasilane comprising:

introducing a tetrasilane (Si$_4$H$_{10}$) isomeric mixture into a solidifying purification tank,
cooling the tetrasilane (Si$_4$H$_{10}$) isomeric mixture to a predetermined temperature by flowing a refrigerant through a jacket of the solidifying purification tank,
maintaining the predetermined temperature between the freezing temperature of n-tetrasilane (n-Si$_4$H$_{10}$) and the freezing temperature of i-tetrasilane (i-Si$_4$H$_{10}$) to freeze the n-tetrasilane (n-Si$_4$H$_{10}$) into a solid form within the tetrasilane (Si$_4$H$_{10}$) isomeric mixture, and
removing liquid i-tetrasilane (i-Si$_4$H$_{10}$) in the tetrasilane (Si$_4$H$_{10}$) isomeric mixture.

2. The purification method for high-purity n-tetrasilane as claimed in claim 1 further comprising:
warming n-tetrasilane (n-Si$_4$H$_{10}$) in solid form to a liquid form, and then distilling the liquid form n-tetrasilane (n-Si$_4$H$_{10}$).

3. The purification method for high-purity n-tetrasilane as claimed in claim 2, further comprising:
flowing the refrigerant in the jacket of the solidifying purification tank but not directly adding the refrigerant to the solidifying purification tank, wherein the solidifying purification tank is connected to an extraction tube for extraction of liquid i-tetrasilane (i-Si$_4$H$_{10}$) and trace amounts of trisilane (Si$_3$H$_8$).

4. The purification method for high-purity n-tetrasilane as claimed in claim 3 further comprising:
reducing pressure within the solidifying purification tank to a pressure of −1.0 kg/cm$^2$G to extract i-tetrasilane (i-Si$_4$H$_{10}$) and lower silane residues.

5. The purification method for high-purity n-tetrasilane as claimed in claim 3 further comprising:
cooling the solidifying purification tank to a temperature that is between −90° C. to −99° C.

6. The purification method for high-purity n-tetrasilane as claimed in claim 3 further comprising:
cooling the solidifying purification tank to −95° C.

7. The purification method for high-purity n-tetrasilane as claimed in claim 3, wherein:
the solidifying purification tank is connected to an output tube connected to a distillation tower, and the output tube is configured to send the liquid form n-tetrasilane (n-Si$_4$H$_{10}$) to the distillation tower;
wherein pentasilanes (Si$_5$H$_{12}$) and heavier silanes in the distillation tower are separated from a bottom of the distillation tower, and trisilane (Si$_3$H$_8$) and i-tetrasilane (i-Si$_4$H$_{10}$) are vented through a top of the distillation tower.

8. The purification method for high-purity n-tetrasilane as claimed in claim 7, wherein a solidifying tank is connected to the solidifying purification tank, and the solidifying tank comprises a refrigeration jacket, an an extraction channel, and a discharge pipe; wherein when the solidifying purification tank is liquifying the solid n-tetrasilane (n-Si$_4$H$_{10}$), the solidifying tank is cools a tetrasilane (Si$_4$H$_{10}$) isomeric mixture introduced into the solidifying tank to separate out unsolidified i-tetrasilane (i-Si$_4$H$_{10}$) and trace trisilane (Si$_3$H$_8$) from solidified n-tetrasilane (n-Si$_4$H$_{10}$) using the extraction channel.

* * * * *